United States Patent
Mayer

(10) Patent No.: US 6,556,844 B1
(45) Date of Patent: Apr. 29, 2003

(54) PROCESS FOR TRANSMITTING DATA, IN PARTICULAR GSM DATA

(75) Inventor: Ralf Mayer, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/068,155

(22) PCT Filed: Sep. 7, 1996

(86) PCT No.: PCT/DE96/01683

§ 371 (c)(1),
(2), (4) Date: May 14, 1998

(87) PCT Pub. No.: WO91/20440

PCT Pub. Date: Jun. 5, 1997

(30) Foreign Application Priority Data

Nov. 29, 1995 (DE) .......................................... 195 44 367

(51) Int. Cl.[7] .......................... H04B 1/38; G10L 21/00; H04Q 7/20; H04Q 7/00; H04J 3/12
(52) U.S. Cl. ........................ 455/560; 455/436; 704/221; 704/212; 704/228; 370/328; 370/523
(58) Field of Search ................................. 455/436, 560, 455/423, 445; 704/221, 212, 200, 228, 226; 375/222, 219; 341/50; 370/328, 523

(56) References Cited

U.S. PATENT DOCUMENTS

| | | | | |
|---|---|---|---|---|
| 4,924,480 | A | * | 5/1990 | Gay et al. ..................... 375/222 |
| 5,091,945 | A | | 2/1992 | Kleijn |
| 5,513,211 | A | * | 4/1996 | Yabusaki et al. ............ 375/219 |
| 5,608,779 | A | * | 3/1997 | Lev et al. ...................... 377/47 |
| 5,953,666 | A | * | 9/1999 | Lehtimaki .................... 455/439 |
| 5,956,673 | A | * | 9/1999 | Weaver, Jr. et al. ......... 704/221 |

* cited by examiner

Primary Examiner—Nay Maung
Assistant Examiner—Raymond Persino
(74) Attorney, Agent, or Firm—Kenyon & Kenyon

(57) ABSTRACT

A data stream between transcoders of a mobile wireless system is subdivided into a first data stream with samples for transmission and a second data stream with signal parameters for reconstruction of user data and/or for signaling. Both data streams are transmitted at the same time permitting an improvement in the quality of transmitted data, e.g. speech data in a GSM network in tandem operation between mobile subscribers.

22 Claims, 2 Drawing Sheets

| Pattern | Description | Value |
|---|---|---|
| TRAU | TRAU frame according to GSM recommendation 08.60 | |
| IDLE | Idle pattern of the A-IF '01010100' | 01010100 |
| PCM | Data different from idle, e.g., speech samples | |
| TRAU* | Special TRAU frame with sync information | |
| IDLE* | Idle only in upper six bits '010101' | 010101-- |
| PCM* | Speech data only in the upper six bits | dddddd-- |
| PCM+ | Speech data only in the upper six bits; the lower two bits are zero | dddddd00 |

PROCESS FOR TRANSMITTING DATA, IN PARTICULAR GSM DATA

FIELD OF THE INVENTION

The present invention relates to a method of transmitting data, in particular GSM data, between at least two subscribers.

BACKGROUND INFORMATION

With previous GSM data circuits, in particular for digitized speech data between mobile stations over a communication network, such as the public telephone system (PSTN—public switched telephone network), GSM data in GSM format has been converted by a transcoder to the frame format of the communication network (64 kbit/s PCM for PSTN). With the DMCS 900 mobile wireless system, such transcoding takes place at the base stations or at the A interface in transfer to the PSTN communication network. According to GSM Recommendation 0860/0861, digital speech transmission takes place in TRAU frames (TRAU= transcode and rate adaptor unit), i.e., transmission frames in 16 kbit/s format for FR (full rate) transmission and 8 kbit/s or 16 kbit/s for HR (half rate) transmission.

U.S. Pat. No. 5,091,945 describes that instead of speech data, it is possible to transmit only signal parameters (speech parameters) from which the user data can be reconstructed.

SUMMARY OF THE INVENTION

According to the present invention, an improvement is achieved in the quality of the data transmitted, specifically GSM speech data, in particular in tandem operation with connections between mobile stations. Due to the simultaneous transmission of samples, e.g., PCM values, and signal parameters for reconstruction of the speech data, this reduces interference when using a transcoder that is not equipped for tandem-free operation with transparent switching of TRAU frames. Even when identification information is transmitted, speech data is still transmitted in the first data stream.

The present invention also improves handover operation. The present invention can be implemented easily in existing systems. Only the speech transcoders of a network are affected. For example, of the 8 bits per speech sample, the two least-significant bits are replaced by a TRAU frame (speech is then reduced to 6 bits) into which identification information and/or synchronization information can be inserted to synchronize the transcoders.

By squeezing the lowest-order bits to zero in transmission of speech samples when establishing a voice connection, the speech quality is improved.

In a handover, i.e., when changing to another transcoder, frame loss can be ascertained rapidly, and it is possible to prevent invalid frames from being processed further as TRAU frames. A transcoder that is not equipped for tandem-free operation can process speech samples during a synchronization operation. If a reduced idle pattern is sent instead of samples after synchronization is concluded, the speech decoder of the transcoder can be switched off or used for other purposes, e.g., for full rate/half rate code conversion in the downlink path.

DETAILED DESCRIPTION

Figure 1:
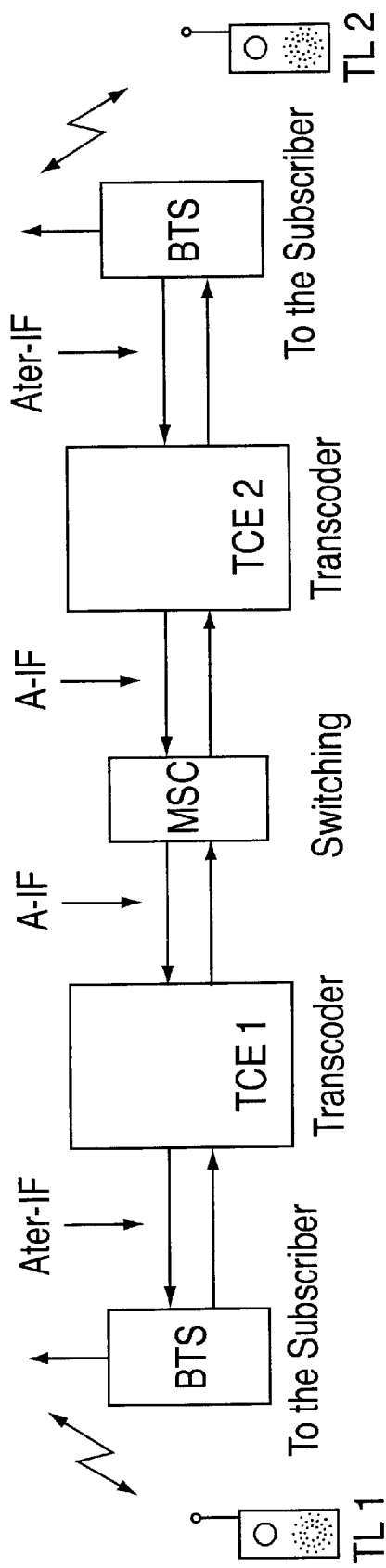
FIG. 1 shows an exemplary call connection between two stations according to the present invention.
Figure 2:
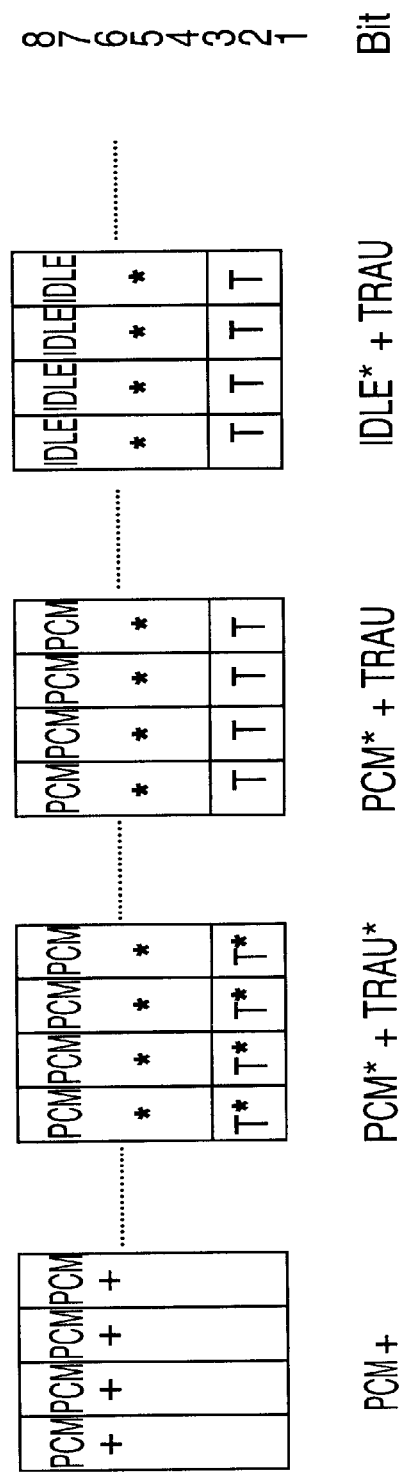
FIG. 2 shows the data of an exemplary transmission interface in chronological sequence according to the present invention.

In the existing GSM network (fixed network side), e.g., the DMCS 900 network, transcoding—i.e., recoding the speech data from the given TRAU (transcode and rate adaptation unit) format according to GSM Recommendation 08.60 to the transmission format of the communication network, e.g., the public telephone network PSTN (PCM values in the 64 kbit/s frame format)—is always performed.

Subscriber T11 initiates a connection with subscriber T12. The transcoding device, hereinafter always referred to as a transcoder, TCE1 assigned to subscriber TL1 sends identification in the traffic channel of the A interface A-IF, signaling to transcoder TCE2 (tandem-) thus connected that it is a transcoder capable of TFO (tandem-free operation). The two transcoders switch to TFO after they have recognized this signal and then exchange speech parameters. If the transcoder encounters a non-TFO-capable transcoder, it will not receive the identifier of the remote station within a certain period of time and therefore will return to normal operation in which it codes and decodes the speech (speech samples).

The interfaces of transcoders TCE1, TCE2 with subscribers T11, T12, which can be connected over fixed wireless stations BTS, for example, are designated as ATER-IF. Switching between transcoders is designated as MSC.

Connecting a Call

When connecting a call, detection of the transfer at the A interface (A-IF) in the two lower (least significant) bits of the A samples from 00 to ≠00 represents the trigger. The trigger may optionally be delayed by $T_{trigger}$.

This trigger condition is selected so as to comply with the following performance of the switching equipment MSC:

a) The MSC sends a non-busy transcoder an IDLE pattern.

b) In the handshake, the MSC first switches a loop between the input and output of the line to the transcoder before it switches through.

c) The MSC switches the two directions through at different rates. This can be equalized with $T_{trigger}$.

Arbitration Procedure

Transcoder TCE1 then sends a TRAU frame (which has previously been used for transmission between the wireless station and transcoder and contains signal parameters for reconstruction of user data) in the least significant two bits of these samples instead of the usual 8 bit PCM samples to the A-IF interface. The data stream between transcoders TCE1 and TCE2 is then subdivided into a first data stream with samples (PCM values) and a second data stream with signal parameters, specifically TRAU frames. Both data streams are transmitted at the same time, in particular during a handshake phase. In such a TRAU frame, TRAU* identification information is sent for a predetermined period of time. As soon as the TRAU* has been recognized by the remote station, they switch to TFO. This process is monitored by a timer $T_{sync}$. When it runs out, they switch to normal operation.

As an alternative, n, n<9 bits for signaling can also be used with any desired frame structures.

As an alternative, the TRAU* identification information can be omitted and only the TRAU frame synchronization information used.

As long as the synchronization $T_{sync}$ is running, the TRAU frames arriving from the $A_{ter}$-IF are sent in the least significant two bits of A-IF following the TRAU* identification information. This permits immediate transfer to TFO in the remote station after receipt of the TRAU* identification information. The more significant six bits of the samples are filled with the processed more significant six bits PCM*. This reduces the quality loss if the remote station is not a TFO-capable transcoder.

If no TRAU* is received within a repeat time $T_{repeat}$ ($T_{repeat}<T_{sync}$), a TRAU* is sent again. The purpose of this second TRAU* is described in the handover case.

TFO (Tandem-free Operation)

After recognizing the TRAU* at the A-IF, the following TRAU frames (contents) are subsequently sent through to $A_{ter}$-IF. Adaptation of the control bits and timing of the $A_{ter}$-TRAU frame is adapted to the local conditions. Non-relevant frames from the remote station (BFI=1, TRAU*) are replaced by a preceding frame and muting is optionally initiated. Any jitter in the TRAU frame length of ±2 bits must also be compensated. Codec conversions, DTX and muting functions are also performed in this direction. The advantage is that no signaling is necessary during the conversation if local conditions change.

In the opposite direction, TRAU frames are sent transparently from the $A_{ter}$-IF to the A-IF. The upper six bits are then replaced by IDLE* (010101) instead of PCM*. This makes it possible to switch off the transcoder function, because this capacity may be needed for the HRC←→FRC conversion in an FR/HR system environment. It also avoids additional operating time. TRAU frames with data content can also be sent through transparently.

Instead of IDLE*, a modulo-n counter can also be installed, permitting even more reliable error detection.

Handover

The handover case is subdivided into the three cases described below.

a) Handover to a TFO-capable Transcoder

First, termination of the incoming TRAU frames is recorded and a timer $T_{release}$ is started. After a certain period of time, the transcoder again receives a TRAU* from the newly connected transcoder TCE2, stops $T_{release}$, sends a TRAU* itself and remains in TFO. The transcoder can thus remain in TFO continuously.

If the first TRAU* cannot be received, because the switching MSC has not yet switched through, its second TRAU* is detected, however, and results in TFO.

Figures 3, 4:
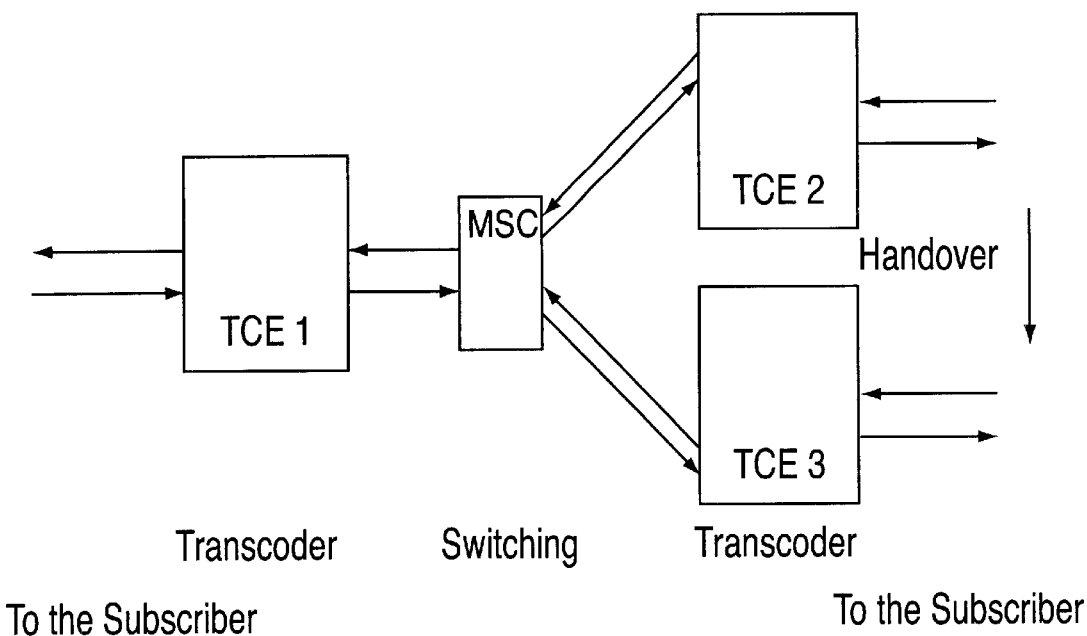
FIG. 3 shows the patterns used in FIG. 2.
FIG. 4 shows an exemplary handover operation according to the present invention.

To detect the handover from transcoder TCE2 to transcoder TCE3 as rapidly as possible and not trigger on a loop on the A-IF, the newly connected transcoder TCE3 (FIG. 4) will send "PCM+" during the handshake. "PCM+" is PCM data with the lower two bits at '00' so as not to simulate TRAU sync bits. This permits suppression of interference at the subscriber's end.

b) Handover to a Non-TFO-capable Transcoder

First, termination of the incoming TRAU frames is recorded and a timer $T_{release}$ is started. Timer $T_{release}$ runs out and the transcoder returns to the arbitration state in which it encodes the incoming data at the A-IF. It attaches PCM samples "PCM*," which are now decoded, to the TRAU frames in the outgoing data stream at A-IF. The TRAU sent first is a TRAU*. Timer $T_{sync}$ is started. Since no TRAU* had been received before timer $T_{sync}$ ran out, the transcoder returns to normal operation.

c) Handover from a Non-TFO-capable Transcoder

If the previous remote station was not TFO-capable, the transcoder cannot recognize the handover. For the new remote station, however, it is a normal handshake in which it first sends a TRAU* if it is TFO-capable. The transcoder receives it, likewise sends a TRAU* and goes into TFO mode. If the switching is delayed, the first TRAU* is lost and the second TRAU* after $T_{repeat}$ leads to success.

Termination of Call

The end of a call is initiated either by termination of the TRAU frames on the $A_{ter}$-IF or by detected errors on the A-IF. The sequence is then the same as in the case of the above-described "handover to a non-TFO-capable transcoder."

Behavior When There are Errors in TFO a) Individual Errors on the A-IF

Individual errors cannot be recognized in the data bits of the TRAU frame. Individual errors can be recognized only in the synchronization bits of the TRAU frames. No measures can be derived from this because there is no information regarding the data bits of the TRAU frame.

b) Burst Error on the A-IF

Routing TRAU frames with a great deal of interference to the Ater-IF means that severe interference noise may occur at the subscriber's end. Therefore, when a single error is detected, a burst error is assumed, the remaining TRAU frame is discarded and replaced by the TRAU frame sent previously. The following measures largely prevent such interference:

1. Double error monitoring procedure:
   1.1 by monitoring the (TRAU) frame synchronization,
   1.2 by monitoring the IDLE* pattern in the upper six bits, as an alternative to 1.2: monitoring by a periodic pattern, e.g., of a modulo-n counter, whose counts are transmitted in the first data stream.

2) Error Masking Buffer

A buffer with approximately x ms (5 ms here) allows storage of the data up to the last TRAU sync bit and replacement by the last valid data in the event of an error.

If the burst is very long, the transcoder switches to normal operation as in the case of the above-described "handover to a non-TFO-capable transcoder."

What is claimed is:

1. A method of transmitting data between a calling subscriber and a called subscriber, using a predetermined frame format, comprising the steps of:

subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching; and simultaneously transmitting the first and second data streams as a function of predetermined operating conditions;

wherein the data is GSM data.

2. The method according to claim 1, wherein the predetermined operating conditions include at least one of a handshake phase, a handover phase, and an error phase.

3. The method according to claim 1, wherein the signal parameters of the second data stream are transcoding rate adaption unit frames for mobile wireless systems.

4. The method according to claim 1, wherein the first data stream includes a first set of more significant bits of a parallel bit sequence, and the second data stream includes a second set of less significant bits of the parallel bit sequence.

5. The method according to claim 4, further comprising the step of forming the second data stream by reducing data of the first data stream.

6. The method according to claim 4, further comprising the step of transmitting the set of more significant bits as PCM samples.

7. The method according claim 1, further comprising the step of transmitting identification information instead of the signal parameters for a predetermined period of time during a handshake phase between the calling subscriber and the called subscriber.

8. The method according to claim 7, further comprising the steps of:
   transmitting only the samples during the handshake phase; and
   inserting zero sequences instead of the signal parameters.

9. The method according to claim 7, further comprising the step of switching the second transcoder assigned to the called subscriber to a tandem-free operation after receiving the identification information from the first transcoder assigned to the calling subscriber.

10. The method according to claim 7, further comprising the step of transmitting a periodic idle pattern instead of the samples after switching to a tandem-free operation.

11. A method of transmitting data between a calling subscriber and a called subscriber, using a predetermined frame format, comprising the steps of:
   subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;
   simultaneously transmitting the first and second data streams as a function of predetermined operating conditions, wherein the data is GSM data; and
   transmitting identification information instead of the signal parameters for a predetermined period of time during a handshake phase between the calling subscriber and the called subscriber, wherein the step of transmitting identification information includes,
   transmitting only samples during the handshake phase, and
   inserting zero sequences instead of the signal parameters, wherein the zero sequences are inserted before the identification information.

12. A method of transmitting data between a calling subscriber and a called subscriber, using a predetermined frame format, comprising the steps of:
   subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;
   simultaneously transmitting the first and second data streams as a function of predetermined operating conditions, wherein the data is GSM data; and
   transmitting identification information instead of the signal parameters for a predetermined period of time during a handshake phase between the calling subscriber and the called subscriber, wherein the signal parameters are transmitted in a transcoding rate adaption unit frame immediately after transmitting the identification information.

13. A method of transmitting data between a calling subscriber and a called subscriber, using a predetermined frame format, comprising the steps of:
   subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;
   simultaneously transmitting the first and second data streams as a function of predetermined operating conditions, wherein the data is GSM data;
   transmitting identification information instead of the signal parameters for a predetermined period of time during a handshake phase between the calling subscriber and the called subscriber;
   transmitting a periodic idle pattern instead of the samples after switching to a tandem-free operation; and
   recording one of a termination of a connection and a transmission error by one of detecting transcoding rate adaption unit frame synchronization information and monitoring the periodic idle pattern.

14. A method of transmitting data between a calling subscriber and a called subscriber, using a predetermined frame format, comprising the steps of:
   subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching, and wherein the signal parameters of the second data stream are transcoding rate adaption unit frames for mobile wireless systems;
   simultaneously transmitting the first and second data streams as a function of predetermined operating conditions, wherein the data is GSM data; and
   recording one of a termination of a connection or a transmission error by one of detecting one of a transcoding rate adaption unit frame synchronization and analyzing a periodic pattern.

15. The method according to claim 14, wherein the periodic pattern is information of a modulo-n counter, and wherein counts of the modulo-n counter are transmitted within the first data stream.

16. A method of transmitting data between a calling subscriber and a called subscriber, using a predetermined frame format, comprising the steps of:
   subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;

simultaneously transmitting the first and second data streams as a function of predetermined operating conditions, wherein the data is GSM data;

transmitting identification information instead of the signal parameters for a predetermined period of time during a handshake phase between the calling subscriber and the called subscriber;

transmitting a periodic idle pattern instead of the samples after switching to a tandem-free operation;

monitoring the second data stream during the handshake phase to determine if non-zero sequences are arriving;

deriving a trigger signal from the monitoring using switching equipment located between the first and second transcoders;

sending the periodic idle pattern using the switching equipment when one of the first transcoder and second transcoder are not busy;

switching a loop in the handshake phase using the switching equipment, between an input and an output of a line to the one of the first transcoder and the second transcoder before the switching equipment switches data through to the one of the first transcoder and the second transcoder; and compensating with the trigger signal if the switching equipment switches the data through at different rates in an input direction and an output direction.

17. The method according to claim 13, further comprising the steps of:

replacing a faulty transcoding rate adaption unit frame with a previously transmitted transcoding rate adaptation unit frame using a remote station; and initiating a muting function.

18. The method according to claim 13, further comprising the steps of:

setting a counter when terminating the connection;

maintaining the tandem-free operation if new identification information is received from a third transcoder within a predetermined counting period;

transmitting the identification information if the new identification information is not received; and terminating the tandem-free operation in the absence of a synchronization.

19. The method according to claim 13, further comprising the steps of:

temporarily storing last-transmitted data; and replacing any defective data with the temporarily stored data for an error masking.

20. A method of transmitting data between a calling subscriber and a called subscriber, using a predetermined frame format, comprising the steps of:

subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;

simultaneously transmitting the first and second data streams as a function of predetermined operating conditions, wherein the data is GSM data; and transmitting identification information instead of the signal parameters for a predetermined period of time during a handshake phase between the calling subscriber and the called subscriber, wherein the step of transmitting identification information includes transmitting only samples during the handshake phase instead of transmitting both samples and signal parameters simultaneously.

21. A method of transmitting data between a calling subscriber and a called subscriber, using a predetermined frame format, comprising the steps of:

subdividing a data stream between a first transcoder assigned to the calling subscriber and a second transcoder assigned to the called subscriber into a first data stream with samples for transmission and a second data stream with signal parameters for at least one of reconstructing user data and signaling, wherein the signal parameters are provided for transparent switching;

simultaneously transmitting the first and second data streams as a function of predetermined operating conditions, wherein the data is GSM data; and transmitting identification information instead of the signal parameters for a predetermined period of time during a handshake phase between the calling subscriber and the called subscriber, wherein the signal parameters are transmitted in a transcoding rate adaption unit frame.

22. A method of transmitting data between a calling subscriber and a called subscriber, using a predetermined frame format, comprising the steps of:

subdividing a data stream between a first transcoder assigned to the calling subscriber and a second transcoder assigned to the called subscriber into a first data stream with samples of speech data for transmission and a second data stream with signal parameters for reconstructing the speech data, wherein the signal parameters are provided for transparent switching; and simultaneously transmitting the first and second data streams as a function of predetermined operating conditions.

* * * * *